United States Patent [19]
Rigg

[11] 3,937,351
[45] Feb. 10, 1976

[54] PRESSURE VESSELS

[75] Inventor: Shepherd Rigg, Warrington, England

[73] Assignee: United Kingdom Atomic Energy Authority, London, England

[22] Filed: Oct. 19, 1973

[21] Appl. No.: 407,957

[30] Foreign Application Priority Data
Oct. 25, 1972 United Kingdom............. 49221/72

[52] U.S. Cl. .................................... 220/3; 220/71
[51] Int. Cl.² ........................................ B65D 7/44
[58] Field of Search .............. 220/3, 71, 5 A, 9 A; 176/87; 215/12 R; 24/16 R

[56] References Cited
UNITED STATES PATENTS

| | | | |
|---|---|---|---|
| 1,580,413 | 4/1926 | Cover | 220/9 A |
| 2,009,606 | 7/1935 | Diffenderfer | 220/5 A |
| 2,308,479 | 1/1943 | Young | 220/5 A |
| 2,381,396 | 8/1945 | Kuhn | 220/3 |
| 3,032,844 | 5/1962 | Seymour et al. | 24/16 R |
| 3,080,085 | 3/1963 | Jezowski | 220/9 A |
| 3,371,488 | 4/1968 | Turner | 220/3 |
| 3,372,828 | 3/1968 | Pechacek | 270/5 A |
| 3,477,605 | 11/1969 | Garland | 220/3 |
| 3,523,063 | 8/1970 | Zerna | 176/87 |
| 3,653,434 | 4/1972 | Andersson | 220/3 |

*Primary Examiner*—William I. Price
*Assistant Examiner*—Allan N. Shoap
*Attorney, Agent, or Firm*—Larson, Taylor and Hinds

[57] ABSTRACT

A cylindrical pressure vessel is provided with means to prevent dispersal of fragments of the vessel wall in the event of the vessel bursting. The vessel is wrapped in two layers of chains, one, the underlayer, lying circumferentially around the barrel of the vessel, the other extending axially. The ends of the axial chains are connected to domed covers which embrace the ends of the vessel.

2 Claims, 6 Drawing Figures

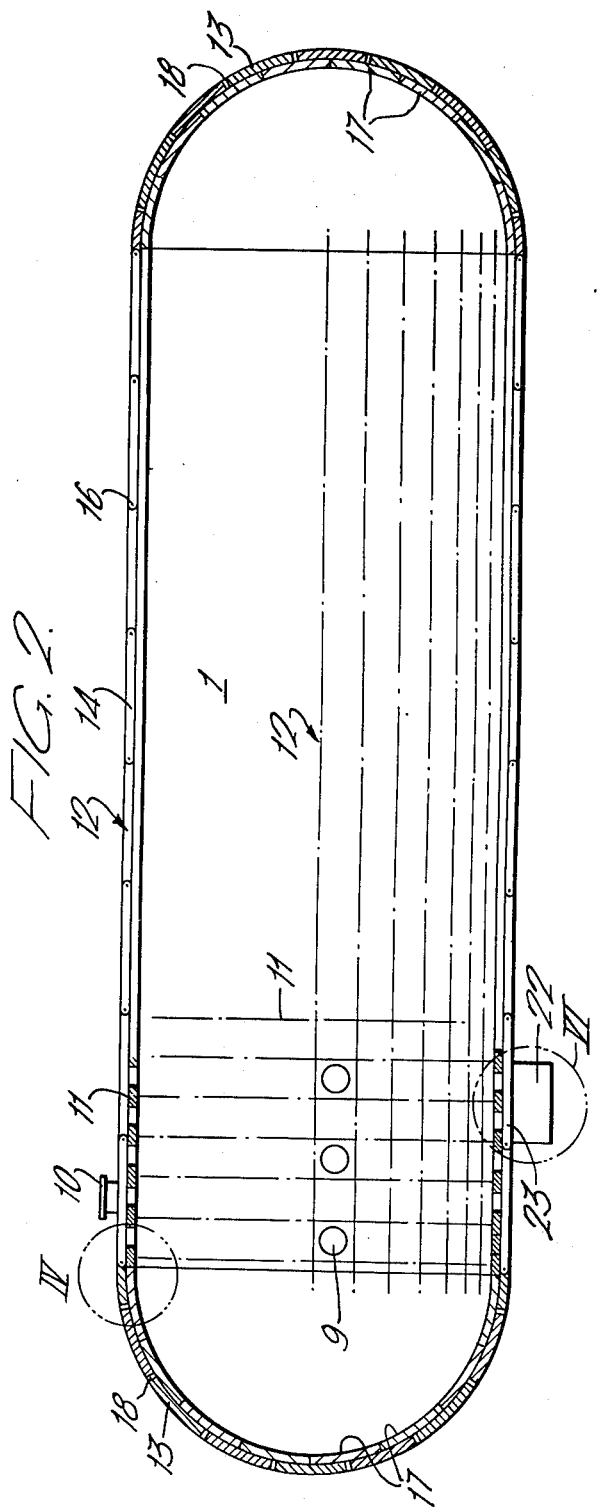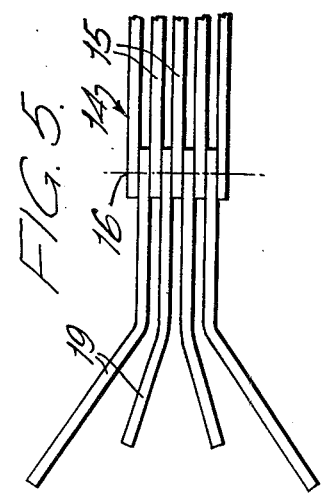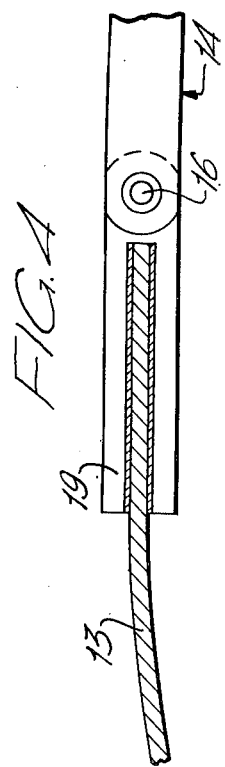

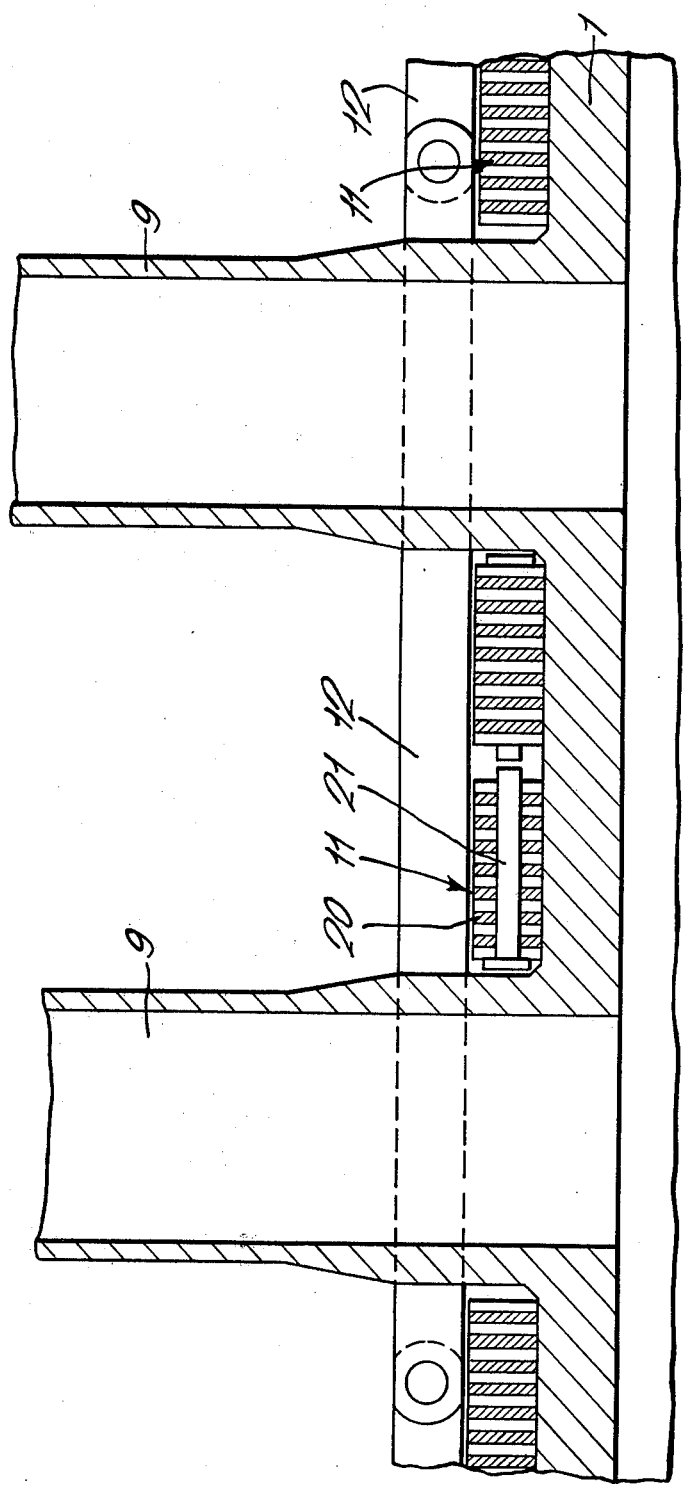

PRESSURE VESSELS

BACKGROUND OF THE INVENTION

This invention relates to pressure vessels especially of cylindrical form. It is acknowledged that there is no difficulty in designing pressure vessels to vent to atmosphere in the event of exceeding the safe operating pressure; there remains the possibility, however remote, that the vessel may fracture with the result that vessel fragments become missiles which could damage adjacent structure or components. One aspect of this problem is in connection with vessels containing noxious fluids where missile-like fragments may puncture secondary containment structures provided to contain the escape of fluid.

SUMMARY OF THE INVENTION

According to the invention there is provided a cylindrical pressure vessel embraced by a first group of spaced, adjacently lying circumferential tendons overlaid by a second group of spaced, adjacently lying axially extending tendons, the axially extending tendons interconnecting two end covers which enclose the end walls of the vessel.

Conveniently the tendons may be chains whose links are elongated plates, preferably arranged in parallel groups, each group pivoted to adjacent groups, the pivotal axis being transverse to the longitudinal run of the chain. The links of the first group of circumferential chains are preferably made curved so as to lie closely adjacent the vessel exterior. The second group of longitudinal chains overlie the first and interconnect end covers. Between the end covers and the vessel end walls deformable packing is provided. The tension in the chains is sufficient to position them on the vessel and does not stress the underlying vessel.

The invention is particularly relevant to the field of atomic energy where pressure vessel such as reactor vessels or steam drums contain a radioactive fluid. As is known such vessels are often double contained so that in the event of vessel leakage, the second containment restricts dispersal of the leakage. However should the vessel fragment, then it is possible for the fragments to become missiles and damage the second containment unless it has been made exceedingly strong. In this context the invention provides a means of protecting the outer containment of double contained pressure vessels by preventing the dispersion of pressure vessel fragments in the event of the pressure vessel bursting. The pressure vessel may be the steam/water separating drum for a water cooled nuclear reactor and such a drum may be of large proportions, for example 3073 mm diameter and 8000 mm parallel length operating at a pressure of for example $6.6 \times 10^6$ M/m². As stated above, although steam drums of such proportions can be designed with an adequate safety margin, the consequences of a breach would be serious and embracement of the vessel in the manner of the invention to prevent disintegration of the vessel in the event of failure in use is an attractive feature.

DESCRIPTION OF THE DRAWINGS

FIG. 2 is an elevation of a steam/water separating drum,

FIG. 3 is a fragmentary section in plan view of the drum, drawn to a larger scale, FIG. 4 is a fragmentary longitudinal section of a detail, designated IV, of FIG. 2, drawn to a larger scale, FIG. 5 is a fragmentary plan view of the detail shown in FIG. 4.

DESCRIPTION OF THE PREFERRED EMBODIMENT

Figure 1:
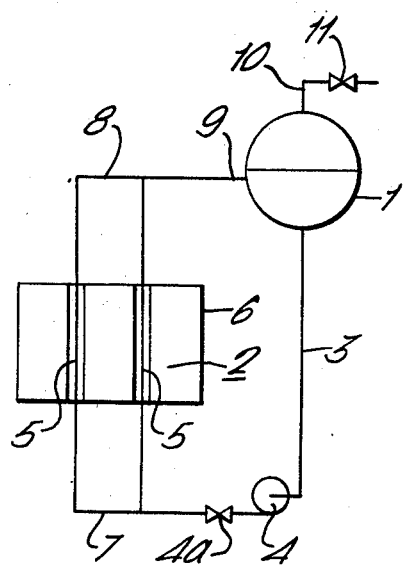
FIG. 1 is a diagrammatic layout

FIG. 1 shows, diagrammatically, the layout of a steam generating, heavy water moderated nuclear reactor. The primary coolant circuit, which operates at $6.6 \times 10^6$ M/m², comprises a steam/water separating drum 1 from which water is circulated through the reactor core 2 by way of a downcomer 3, circulator 4 with isolating valve 4a, and pressure tubes 5. The pressure tubes contain nuclear reactor fuel and pass through a calandria vessel 6 containing heavy water moderator. The pressure tubes are arranged in parallel groups of tubes, each group having a common feeder line 7 from the circulator 4 and a common outlet line 8 which enters the side of the steam/water separator drum. Referring to FIG. 2 the drum has connections 9 (only three being shown) for receiving the lines 8 arranged along each side and has outlet branches 10 (only one being shown) for delivery of steam to a steam turbine stop valve V shown in FIG. 1. The drum is 3073 mm internal diameter and of 8000 mm parallel length with hemispherical ends. The drum is embraced by 28 equally spaced circumferential chain tendons 11 overlaid by thirty-two equi-angularly spaced axial chain tendons 12. The axial chain tendons 12 are interconnected by end covers 13 for the hemispherical end closures of the drum. The axial chain tendons 12 have links 14 of 1000 mm pitch, each link comprising five parallel plates 15 (shown in FIG. 5) pivotably connected to adjoining links by 20 mm diameter pins 16; the plates are 40 mm wide × 10 mm thick. The end covers 13 are spaced from the enclosures of the vessel by aluminium packings 17 so that the longitudinal axis of the axial chains are disposed tangentially to the covers 13 and through holes 18 are provided to enable the spacings to be checked by depth gauge. The chains 12 are pivotably connected to the end covers 13 by pins 16 each secured by four spaced lugs 19 welded to the end covers as shown in FIGS. 4 and 5. The circumferential chain tendons 11 have links of 500 mm pitch each link comprising seven parallel arcuate plates 20 pivotably connected to adjoining links by 20 mm diameter pins 21; the plates are 40 mm wide and 10 mm thick. The circumferential chain tendons lie between the connections 9. The links of the chains are of carbon steel whilst the end covers 13 and lugs 19 are of maraging steel which is a nickel alloy steel capable of recovering its tensile strength after welding by suitable heat treatment.

Figure 6:
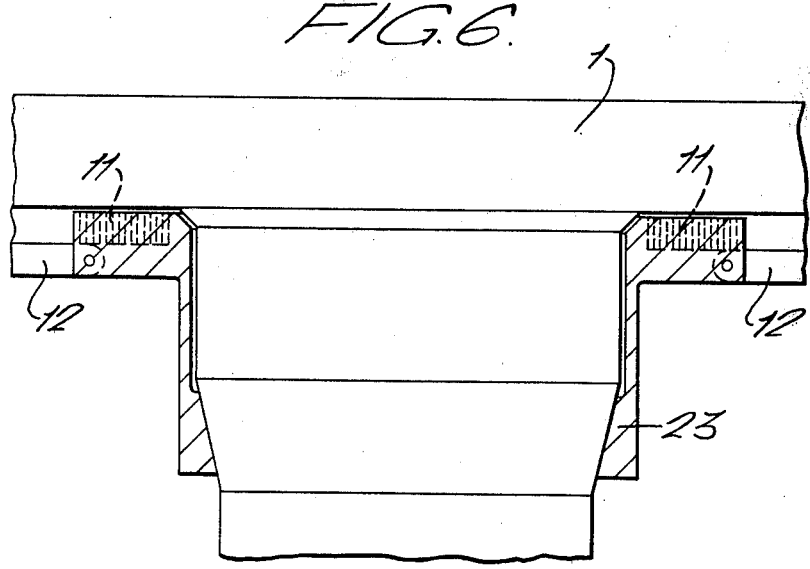
FIG. 6 is a fragmentary longitudinal section of a detail, designated VI, of FIG. 2, drawn to a larger scale.

The separator drum has a plurality of downcomer connections 22 (only one being shown in FIG. 2) each of which is embraced by a chain anchor ring 23 as shown in FIG. 6. Where the anchor rings lie in the paths of axial and circumferential chains, the chains are interrupted and pivotably connected to the anchor rings.

In the event of the development of stress cracks whilst the vessel is pressurised the embracing tendons will prevent rapid disintegration of the vessel.

We claim:

1. A cylindrical pressure vessel comprising a central barrel portion and two part spherical end portions, the vessel being provided with means for preventing dispersal of vessel fragments in the event of the vessel being breached, said means comprising a first group of circumferential chains lying side by side along the barrel portion and a second group of axially extending chains on top of said first group of chains, each said chain comprising a plurality of plates which are pivotably interconnected to each other but are unconnected to the vessel surface, said means further comprising end enclosures overlying the part spherical end portions and retained in position by the second group of chains.

2. A cylindrical pressure vessel as claimed in claim 5 in which the vessel is the steam drum of a steam raising nuclear reactor, the vessel having at least one downcomer pipe connected to receive steam from a water cooled nuclear reactor, anchor rings threaded over said downcomer pipe at its intersection with the vessel and pivoted connections between the anchor ring and those axially extending chains which lie in the path of the downcomer pipe.

* * * * *